June 28, 1960      A. O. LANGSETH      2,943,002
ARTIFICIALLY COLORED ROOFING GRANULES
Filed May 11, 1959
Base granule.
Well-bonded, substantially non-alkaline, water-insoluble coating containing anhydrous aluminum silicate.
INVENTOR
AXEL O. LANGSETH
BY
Carpenter, Abbott, Coulter & Kinney
ATTORNEYS United States Patent Office 2,943,002
Patented June 28, 1960

2,943,002
ARTIFICIALLY COLORED ROOFING GRANULES

Axel O. Langseth, St. Paul, Minn., assignor to Minnesota Mining and Manufacturing Company, St. Paul, Minn., a corporation of Delaware Filed May 11, 1959, Ser. No. 812,554

3 Claims. (Cl. 117—100)

This application is a continuation-in-part of my application Serial No. 623,297, filed November 20, 1956, now abandoned.

This invention relates to improvements in coated mineral granules, certain sheet structures, and, more particularly, relates to improved weather-resistant and bloom-resistant, color-fast roofing granules and a process for making the same. The coatings of granules prepared as described herein are, in particular, well bonded to the underlying base mineral granule, and have good color permanence.

Methods have long been known for the artificial coloring of roofing granules, consisting of crushed and screened minerals, in which the granules are coated with a suitable pigment in an inorganic bond. Preferably this bond is water insoluble and highly adherent to the base granule. In carrying out these processes the granules are mixed with a pigment and a soluble silicate solution until a thorough coating of the granules is obtained, and the soluble silicate is then insolubilized. The soluble silicate, usually sodium silicate, is converted into the insoluble state by subjecting the granules to heat treatment, e.g. roasting temperatures; by chemical action; or by a combination of chemical action and heat treatment. Highly satisfactory granules have been made by all of these methods. Insolubilization of the silicate granule coating at low temperatures affords some advantage over the high temperature processes, not only in respect to lower fuel cost, but also in widening the choice of pigments that may be used and in permitting the employment of certain pigments, such as organic pigments, which are deleteriously affected at high temperatures.

The present invention is particularly concerned with the production of artifically colored granules made by the more economical low temperature process, where insolubilization of the coating is accomplished by a combination of heating and chemical treatment; but the teachings herein are not solely limited to granules produced by the low temperature process. A major problem in the low temperature process, however, is to prepare well-bonded coatings which have satisfactory permanence of color without resorting to reaction temperatures on the order of 850° F. to 1450° F. or so, as taught for example, in Jewett U.S. Patent No. 2,379,358.

In this Jewett patent it is pointed out that kaolin, i.e., hydrated aluminum silicate, may advantageously be used in preparing color-fast, well-bonded coatings on granules. High temperatures, however, have been found necessary in order to promote the necessary reaction between the kaolin and the alkali silicate, and thereby achieve the full benefits of the kaolin. At low temperatures, e.g., temperatures below 600° F., it is found that coatings containing any appreciable amount of kaolin are not well bonded, show color losses, and have inadequate resistance to weathering, as much as 40% or more of the pigment of the coatings being lost in a water boil test commonly used in this art as an indication of weather resistance.

It was particularly surprising to me, therefore, to find that by using anhydrous aluminum silicate, as distinguished from hydrated aluminum silicate or kaolin, I could prepare coated granules at low temperatures which exhibited high resistance to weathering, high color permanence, and other desired properties, even though past experience with the aluminum silicate known as kaolin would indicate that appreciable amounts of an aluminum silicate compound would not be suitable for use in preparing well-bonded coatings for granules according to the low temperature process. In particular, my coatings prepared using anhydrous aluminum silicate were very well bonded and, in boil tests as used in this art to gain an indication of weather resistance, showed only a surprisingly small loss of pigment as compared to granules coated in an otherwise identical manner but employing hydrated aluminum silicate or kaolin. This becomes particularly surprising when it is realized that such results are obtainable at low temperatures.

I have not been able to formulate a satisfactory theory to account for the surprising behavior of anhydrous aluminum silicate as compared to kaolin, its hydrated counterpart, in coatings prepared according to the low temperature process. One may conjecture on the possibility that the water of hydration may have something to do with it. On the other hand, hydrated alumina as taught in Lodge U.S. Patent No. 2,695,851 has been used satisfactorily in the low temperature process to prepare coated granules. Thus the fact that kaolin contains water of hydration would not seem to account for the striking difference between it and anhydrous aluminum silicate in coatings prepared as described herein. Whatever the explanation, the coatings of the granules of this invention all have a characteristic and critical feature: They all contain anhydrous aluminum silicate essentially chemically unreacted with the insolubilized alkali silicate of the coating.

My invention finds its greatest utility in the preparation of white, buff, and colored, particularly various pastel colored, coatings for roofing granules. Advantageously, a noticeable reduction in the amount of pigment needed to artificially color mineral base granules, and mask out undesired color of the base granules, is possible when anhydrous aluminum silicate is employed, as illustrated in the examples hereof. This further contributes to the economy of the process, and the resulting product.

A coated roofing granule prepared as taught herein is schematically illustrated in the drawing made a part hereof.

In preparing the well-bonded, color-fast coated granules of this invention, crushed mineral material is first warmed to a temperature between approximately 90 and 180° F. and then mixed, for example, with a fluid film-forming slurry containing the finely divided anhydrous aluminum silicate, pigment, and a water soluble alkali silicate binder. Mixing is suitably accomplished in a tumbling barrel type mixer, e.g., an ordinary concrete mixer, until the granules are coated with a thin layer of the slurry. Toward the end of the mixing operation, a stream of air is passed for about 2 to 10 minutes through the mixing apparatus so as to partially dry the coated granules. Thereafter, they are dried in the low temperature process with a minimum of agitation at a temperature above 250° F. and below 600° F., preferably about 400° F., in a rotary kiln such as widely used in this art. At this raised temperature the coating is more completely dehydrated and becomes dense, rigid, and abrasion resistant. In the high temperature process, temperatures as high as 1000–1500° F. may be used, and serve to promote a chemical reaction between alkali silicate and any hydrated aluminum silicate such as kaolin which may be present; however, such high temperatures need not necessarily be employed in preparing coated granules according to my invention. Whether high or low temperatures are used to prepare my coated granules, however, the resulting coatings contain anhydrous aluminum silicate chemically essentially unreacted with the insolubilized alkali silicate of the coating.

After drying, particularly in the case of granules prepared according to the low temperature process, and while the granules are still at a somewhat raised temperature, usually about 180° to 380° F., a water solution of an acidic pickling compound is applied to them, as by spraying, in order to complete insolubilization of the soluble silicate coating. The heat of the granules at this point is normally sufficient to evaporate the water added during this chemical pickling step and leave them in a substantially dry condition. The process of pickling, of course, may be varied. After pickling, the dried granules may be treated with suitable oils such as paraffin oil or linseed oil to increase their adhesion to a bituminous substrate such as used in the roofing industry, or given an adhesion treatment using materials such as disclosed in U.S. Patent No. 2,595,465 to Keene et al., or given any other suitable treatment known to the roofing art.

The resulting coated granules have a particularly well-bonded coating, are weather-resistant, and "color-fast." They are useful in the manufacture of decorative and protective, durable roofing sheets. For example, they may be applied in a layer over the surface of a heated bituminous, e.g., asphalt, coated fibrous sheet, and pressed into place by rollers. Water is then ordinarily sprayed over the sheet to cool and harden the asphalt binder prior to cutting and packing the finished roofing.

Various mineral materials may be crushed and used as a base granule upon which a coating is applied. Nonporous rocks or minerals such as argillite or greystone (found in large deposits near Wausau, Wisconsin), greenstone, certain granites, etc., are preferred materials, but other minerals such as traprocks and slates are also suitable. The raw material, whether pervious or impervious, is crushed to a particulate size between approximately 10 and 35 mesh, e.g., so as to pass a 10 mesh screen and be retained on a 35 mesh screen.

The amount of anhydrous aluminum silicate employed in coating may vary considerably, but ordinarily will range from at least about 1 or 2 pounds per ton of granules up to an amount approximately double the amount of alkali silicate solids in the coating slurry, e.g., not over about 35 pounds of anhydrous aluminum silicate per ton of granules. Usually, however, the amount of anhydrous aluminum silicate employed will not be greatly in excess of the amount of alkali silicate solids employed. Extremely large amounts of anhydrous aluminum silicate are not seen to impart noteworthy improvement to the coated granule and in fact tend to lower the strength of the bond formed. The particle size of the anhydrous aluminum silicate is also critical, particles on the order of a micron up to about 40 microns at their longest dimension being suitable. The smaller particle sizes in this range give the best results in terms of bond strength, resistance to abrasion, thermal and mechanical shock, etc. A suitable anhydrous aluminum silicate is that available commercially from Southern Clays, Inc. under the name "Al-Sil-Ate W." In the powdery form in which it is marketed and used in accordance with the teachings hereof, approximately 70% of its particles are in the range of 1 to 2 microns or less, the remainder being in the range of about 3 to 35 microns in size. "Al-Sil-Ate W" has a ratio of $Al_2O_3$ to $SiO_2$ of approximately 1:2.4. Another suitable anhydrous aluminum silicate was prepared by calcining pyrophyllite at about 1600° F. for a time sufficient to remove its water of hydration. Calcined pyrophyllite has a ratio of $Al_2O_3$ to $SiO_2$ of about 1:4. Another was prepared by calcining kaolin, which gave an anhydrous aluminum silicate having a ratio of $Al_2O_3$ to $SiO_2$ of about 1:2. Calcined pyrophyllite and calcined kaolin, in particle sizes below about 40 microns, both have been used satisfactorily to achieve the benefits of this invention. In my process there is no indication that anhydrous aluminum silicate reacts to form a product with other components of the coating; instead indications are that it remains unreacted in the coating. Specifically, it remains chemically essentially unreacted with the insolubilized alkali silicate in the coating. This is a primary distinguishing characteristic between the behavior of hydrated aluminum silicate, which chemically reacts with alkali silicate in a granule coating at high temperatures, and anhydrous aluminum silicate, which remains unreacted with the alkali silicate in the coating in both the low temperature process as well as the high temperature process of preparing coated granules.

Pigments satisfactory to use in coloring the coatings may vary widely. Some illustrative suitable pigments are titanium dioxide, yellow iron oxide, ultramarine blue, phthalocyanine green, etc.

Aqueous sodium silicate is the preferred alkali silicate to employ, due to its availability and economy, although equivalent materials such as potassium silicate, may likewise be used. The preferred grade of sodium silicate has a ratio of $Na_2O$ to $SiO_2$ of 1:2 up to 1:3.25, e.g., a silicate solution having a ratio of $Na_2O$ to $SiO_2$ of about 1:2.9, a gravity of 47° Baumé, and a solids content of 40–42%. A commercial example of sodium silicate of this type is the "K" brand of Philadelphia Quartz Company. Variations in the alkalinity of the silicate are permissible but the higher alkalinities are generally to be avoided inasmuch as they require increased amounts of pickling compounds for insolubilization of the coating. Increased $SiO_2$ content, on the other hand, reduces the film-forming properties, as well as attainable concentrations for the silicate. Usually an amount of alkali silicate solution from about 20 to 50 pounds or more per ton of granules is employed. In terms of alkali silicate solids, from about 8 to about 25 pounds of alkali silicate solids per ton of granules is used. While unnecessary, larger amounts may be employed.

Chemical insolubilization of a low temperature coating (see for example Buzzell et al. Patent 2,614,051) may be accomplished by using singly, or in combination, any of a wide variety of acidic pickling compounds, e.g., ammonium chloride, aluminum chloride, hydrochloric acid, calcium chloride, aluminum sulfate, magnesium chloride, etc. Any suitable acidic pickling compound which insolubilizes the silicate coating on a granule may be useful.

Generally, the quantity of pickling compound used to insolubilize the coating by reacting with the alkali portion thereof is approximately the theoretical amount required to neutralize the coating on the granules. This amount may be determined by estimating the approximate amount of alkali in a coating and then calculating the equivalent amount of a particular acidic pickling compound needed to neutralize the same. In general, amounts will range between 2 and 10 pounds of pickling compound per ton of coated granules, and the compound is applied to the granules in water solution.

The following non-limitative examples are offered to further illustrate my invention. The weight of ingredients in the examples is sufficient for the treatment of one ton of granules, e.g., a ton of crushed and screened quartzite, argillite, etc.

*Example 1*

Green colored granules were prepared using the following formula for coating:

| | Pounds |
|---|---|
| Chromium oxide | 8.1 |
| Yellow iron oxide hydrate ("Ferrite yellow") | 1.6 |
| Phthalocyanine green pigment (20% solids dispersed in water) | 1.38 |
| "Al-Sil-Ate W" | 8.7 |
| "K" brand aqueous solution of sodium silicate | 30.5 |
| Water | 7.2 |

These ingredients are mixed together to form a fluid film-forming slurry which then may be coated upon previously warmed granules in a rotating concrete mixer. Air is then circulated through the mixer during latter stages of the mixing operation until the moisture content has been reduced sufficiently to make the mass of granules free-flowing. The granules are then fired, preferably in a rotary kiln, at a temperature of approximately 380–400° F. for about five to 20 minutes depending on the size of the kiln, and other factors, to dehydrate more completely the coating. The granules are then sprayed with a pickling solution and cooled. Fourteen pounds of a water solution of 30% concentration of a mixture of equal parts aluminum chloride and hydrochloric acid was used per ton of granules. The heat of the granules is sufficient to cause the water of this pickling solution to evaporate and leave the treated granules in a dry condition at lower temperature. The granules are then further cooled. They may be oiled and applied to asphalt to form a decorative roofing sheet.

The granules of this example were a green color. In various tests the coatings showed high resistance to weathering and blooming, high color intensity and permanency, and excellent bonding to the base granule.

*Example 2*

Using the process of Example 1, two separate batches of white granules were prepared using slurries of the following formula:

|  | Pounds (Batch A) | Pounds (Batch B) |
| --- | --- | --- |
| Titanium dioxide | 10 | 32 |
| "Al-Sil-Ate W" | 8 | 24 |
| "K" brand aqueous solution of sodium silicate | 30 | 45 |
| Water | 19 | 20 |

Chemical insolubilization of these granules was accomplished using a pickling solution such as set forth in Example 1.

Both batches of the granules of this example were highly resistant to weathering and blooming. Their coatings were well-bonded and "color-fast."

Two separate batches of granules were prepared in all respects identical to the granules of this Example 2 except that the "Al-Sil-Ate W" was omitted from each formula. In light reflection tests, they each showed a significantly lower amount of luminous reflectance or lightness as compared to the respective formulas of this example containing anhydrous aluminum silicate.

Using the teachings herein, it will be evident to those skilled in the art that various modifications of the specific illustrative examples set forth above are possible, and may be used advantageously, for example, to prepare granules of colors other than those of the examples.

As aforementioned, my granules are particularly useful in the fabrication of durable, weather-resistant, decorative and protective roofing.

That which is claimed is:

1. Weather-resistant and bloom-resistant artificially colored roofing granules comprising a mineral base granule coated with a well-bonded, substantially non-alkaline and water-insoluble surface coating comprising anhydrous aluminum silicate of an average particle size between approximately 1 and 40 microns, a pigment, and an inorganic bond, said bond consisting essentially of an insolubilized alkali silicate, said anhydrous aluminum silicate and said insolubilized alkali silicate being chemically essentially unreacted in said coating.

2. Decorative sheets adapted for use as a roofing material and comprising a bituminous sheet material surface coated on at least one side with an adherent layer of weather-resistant and bloom-resistant artificially colored granules comprising a mineral base granule having a well-bonded, substantially non-alkaline and water-insoluble surface coating comprising ingredients which are chemically essentially unreacted in said coating, said ingredients including an anhydrous aluminum silicate of an average particle size between approximately 1 and 40 microns, a pigment, and an inorganic bond, said bond consisting essentially of an insolubilized alkali silicate.

3. The method of coating base mineral granules with well-bonded "color-fast" coatings comprising forming on said base granules a coating of a fluid, film-forming slurry containing a pigment, an alkali silicate, and anhydrous aluminum silicate of an average particle size between approximately 1 and 40 microns, the amount of said anhydrous aluminum silicate being not in excess of double the amount of alkali silicate solids in said slurry, drying said coating at a raised temperature up to 600° F., thereby to maintain the ingredients of said coating chemically essentially unreacted, and treating the dried coating with a sufficient quantity of a water solution of an alkali-reactive, acidic pickling compound so as to insolubilize said coating, thereby to obtain a well-bonded, abrasion-resistant, and shock-resistant coating of high color permanence.

No references cited.

Notice of Adverse Decision in Interference

In Interference No. 91,681 involving Patent No. 2,943,002, A. O. Langseth, Artificially colored roofing granules, final judgment adverse to the patentee was rendered Oct. 11, 1963, as to claims 1, 2 and 3.

[*Official Gazette February 4, 1964.*]